United States Patent
Young et al.

(10) Patent No.: US 9,324,470 B2
(45) Date of Patent: Apr. 26, 2016

(54) DISORDERED METAL HYDRIDE ALLOYS FOR USE IN A RECHARGEABLE BATTERY

(71) Applicant: Ovonic Battery Company, Inc., Rochester Hills, MI (US)

(72) Inventors: Kwo-hsiung Young, Troy, MI (US); Taihei Ouchi, Oakland Township, MI (US)

(73) Assignee: Ovonic Battery Company, Inc., Rochester Hills, MI (US)

( * ) Notice: Subject to any disclaimer, the term of this patent is extended or adjusted under 35 U.S.C. 154(b) by 182 days.

(21) Appl. No.: 13/926,093

(22) Filed: Jun. 25, 2013

(65) Prior Publication Data

US 2014/0374651 A1   Dec. 25, 2014

(51) Int. Cl.
*H01B 1/02*   (2006.01)
*C22C 19/00*   (2006.01)
*H01M 4/00*   (2006.01)
*H01M 4/38*   (2006.01)

(52) U.S. Cl.
CPC *H01B 1/02* (2013.01); *C22C 19/00* (2013.01); *H01M 4/383* (2013.01)

(58) Field of Classification Search
CPC ........ H01B 1/02; H01M 4/242; H01M 4/383; C01B 3/0005; C01B 3/0031; C22C 19/00; C22C 23/00; C22C 30/00; C22C 1/0491
See application file for complete search history.

(56) References Cited

U.S. PATENT DOCUMENTS

| | | | | |
|---|---|---|---|---|
| 4,832,913 A | * | 5/1989 | Hong | C01B 3/0005 420/581 |
| 5,840,440 A | * | 11/1998 | Ovshinsky et al. | 429/60 |
| 6,214,492 B1 | | 4/2001 | Kono et al. | |
| 7,544,442 B2 | | 6/2009 | Yasuoka et al. | |
| 2001/0003997 A1 | * | 6/2001 | Fetcenko | C01B 3/0031 148/442 |
| 2010/0178561 A1 | | 7/2010 | Kakeya et al. | |
| 2010/0239906 A1 | | 9/2010 | Ozaki et al. | |
| 2012/0134871 A1 | | 5/2012 | Bernard et al. | |
| 2014/0374652 A1 | * | 12/2014 | Young et al. | 252/182.1 |

FOREIGN PATENT DOCUMENTS

JP   2012174639 A   9/2012

OTHER PUBLICATIONS

Nakamura et al "Structural studies of hydrogen storage alloys . . . ", Mater. Res. Soc. Symp. Proc. vol. 1334 (2011) DOI:10.1557/op1.2011.1310.*
Zhang et al "Impacts of melt spinning and element substitution on electrochemical characteristics of the La—Mg—Ni-based A2B7-type alloys", Advances in Materials Physics and Chemistry, 2012, 2, 78-83.*
International Search Report and Written Opinion for co-pending PCT Application No. PCT/US2014/044042, issued Oct. 27, 2014.
Young K., et al., "Effects of Annealing and Stoichiometry to (ND, MG)(NI, AL)3.5 Metal Hydride Alloys," J. Power Sources, 215:152, 2012.
Yasuoka S., et al., "Development of High-capacity Nickel-metal Hydride Batteries Using Superlattice Hydrogen-absorbing Alloys," J. Power Sources, 156:662, 2006.

* cited by examiner

*Primary Examiner* — Mark Kopec
(74) *Attorney, Agent, or Firm* — Dinsmore & Shohl LLP; Weston R. Gould

(57) ABSTRACT

A structurally and compositionally disordered electrochemically active alloy material is provided with excellent capacity and cycle life, as well as superior high-rate dischargeability. The alloy employs a disordered $A_2B_4+x(AB_5)$ structure, wherein x is a number between 1 and 4. This crystal structure combined with a tailored amount of electrochemically active $AB_5$ secondary phase material produces superior electrochemical properties.

16 Claims, 13 Drawing Sheets

DISORDERED METAL HYDRIDE ALLOYS FOR USE IN A RECHARGEABLE BATTERY

FIELD OF THE INVENTION

This invention relates to alloy materials and methods for their fabrication. In particular, the invention relates to metal hydride alloy materials that are capable of absorbing and desorbing hydrogen. Disordered metal hydride alloy materials are provided that manifest improved high-rate dischargeability.

BACKGROUND OF THE INVENTION

Certain metal hydride (MH) alloy materials are capable of absorbing and desorbing hydrogen. These materials can be used as hydrogen storage media, and/or as electrode materials for fuel cells and metal hydride batteries including nickel/metal hydride (Ni/MH) and metal hydride/air battery systems.

When an electrical potential is applied between the cathode and a MH anode in a MH cell, the negative electrode material (M) is charged by the electrochemical absorption of hydrogen to form a metal hydride (MH) and the electrochemical evolution of a hydroxyl ion. Upon discharge, the stored hydrogen is released to form a water molecule and evolve an electron. The reactions that take place at the positive electrode of a nickel MH cell are also reversible. Most MH cells use a nickel hydroxide positive electrode. The following charge and discharge reactions take place at a nickel hydroxide positive electrode.

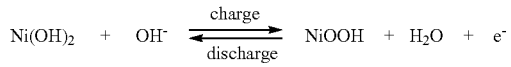

In a MH cell having a nickel hydroxide positive electrode and a hydrogen storage negative electrode, the electrodes are typically separated by a non-woven, felted, nylon or polypropylene separator. The electrolyte is usually an alkaline aqueous electrolyte, for example, 20 to 45 weight percent potassium hydroxide.

One particular group of MH materials having utility in MH battery systems is known as the $AB_x$ class of material with reference to the crystalline sites occupied by its member component elements. $AB_x$ type materials are disclosed, for example, in U.S. Pat. No. 5,536,591 and U.S. Pat. No. 6,210,498. Such materials may include, but are not limited to, modified $LaNi_5$ type ($AB_5$) as well as the Laves-phase based active materials ($AB_2$). These materials reversibly form hydrides in order to store hydrogen. Such materials utilize a generic Ti—Zr—Ni composition, where at least Ti, Zr, and Ni are present with at least one or more of Cr, Mn, Co, V, and Al. The materials are multiphase materials, which may contain, but are not limited to, one or more Laves phase crystal structures.

These prior $AB_5$ MH materials suffer from insufficient hydrogen-absorbing capabilities which equates to low energy density. This has made increasing the capacity of systems employing these materials exceedingly difficult. On the other hand, $AB_2$ alloys commonly suffer from high cost and low high-rate performance.

Rare earth (RE) magnesium-based $AB_3$- or $A_2B_7$-types of MH alloys are promising candidates to replace the currently used $AB_5$ MH alloys as negative electrodes in Ni/MH batteries due in part to their high capacities. While most of the RE-Mg—Ni MH alloys were based on La-only as the rare earth metal, some Nd-only $A_2B_7$ ($AB_3$) alloys have recently been reported. In these materials, the $AB_{3.5}$ stoichiometry is considered to provide the best overall balance among storage capacity, activation, high-rate dischargeability (HRD), charge retention, and cycle stability. The pressure-concentration-temperature (PCT) isotherm of one Nd-only $A_2B_7$ alloy showed a very sharp take-off angle at the α-phase [K. Young, et al., Alloys Compd. 2010; 506: 831] which can maintain a relatively high voltage during a low state-of-charge condition. Compared to commercially available $AB_5$ MH alloys, a Nd-only $A_2B_7$ exhibited a higher positive electrode utilization rate and less resistance increase during a 60° C. storage, but also suffered higher capacity degradation during cycling [K. Young, et al., Int. J. Hydrogen Energy, 2012; 37:9882]. Another issue with known $A_2B_7$ alloys is that they suffer from inferior HRD relative to the prior $AB_5$ alloy systems.

As will be explained hereinbelow, the present invention is directed to disordered MH alloy materials that have multiple phases contributing to the electrochemical performance of the alloys. The alloys provided have a tailored and disordered crystal structure that improves the HRD relative to prior RE magnesium-based $AB_3$- or $A_2B_7$-types of MH alloys. These and other advantages of the invention will be apparent from the drawings, discussion, and description which follow.

SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

Disclosed is a compositionally and structurally disordered $A_2B_4+x(AB_5)$ alloy, wherein x is a number between 1 and 4, and wherein at least one electrochemically active secondary phase is dispersed in the alloy and characterized in that said secondary phase contributes to the electrochemical performance of the alloy. The combination of the disordered composition and structure with the electrochemically active phase may achieve a high-rate dischargeability (HRD) of 0.977 or greater, optionally 0.988 or greater. Some embodiments include a crystallite size on the a-b plane that is 40% larger than along the c-axis.

An alloy has a primary phase and one or more secondary phases, at least one of which is electrochemically capable of absorbing or desorbing hydrogen. The secondary phase optionally is an $AB_5$ phase. The $AB_5$ phase is optionally present at 2% to 8% in the material.

The alloy, optionally with the cited HRD and secondary phase, is formed from a hydride forming metal component. The hydride forming metal component is optionally La, Ce, Pr, Nd, Pm, Sm, Y, or mixtures thereof. Optionally, a hydride forming metal component includes from this list Nd only. A hydride forming metal component, whether including a metal of La, Ce, Pr, Nd, Pm, Sm, Y, mixtures thereof, or Nd only, optionally includes one or more additives, optionally Mg. Mg, if present, is optionally present at less than 10 atomic percent, optionally less than 5 atomic percent, optionally less than 3.3 atomic percent.

Processes of forming a hydrogen storage material are also provided that include, providing an ingot where the ingot includes a hydride forming metal component and a non-hydride forming metal component. The hydride forming metal optionally includes La, Ce, Pr, Nd, Pm, Sm, Y, or mixtures thereof. Optionally, a hydride forming metal component includes from this list Nd only. A hydride forming metal component optionally includes Mg at less than 10 atomic percent, optionally less than 5 atomic percent, optionally less than 3.3 atomic percent. The ingot is then subjected to annealing at a temperature greater than 900 degrees Celsius for an annealing time, whereby the annealing produces a compositionally and structurally disordered $A_2B_4+x(AB_5)$ alloy, wherein x is a number between 1 and 4, and wherein at least one electrochemically active secondary phase is dispersed in the alloy and characterized in that the secondary phase contributes to the electrochemical performance of the alloy. Annealing is optionally for an annealing time of 4.5 to 8 hours, optionally 5 hours. The annealing temperature is optionally from 925 to 940 degrees Celsius. Annealing is optionally performed for 5 hours at an annealing temperature of 925 to 940 degrees Celsius.

The processes optionally produce an electrochemically active alloy material that has a high-rate dischargeability of 0.977 or greater, optionally 0.988 or greater.

In many embodiments, the processes produce a disordered alloy structure that has an average crystallite size on the a-b plane at least 40% larger than along the c-axis.

BRIEF DESCRIPTION OF EMBODIMENTS OF THE INVENTION

Figure 1:
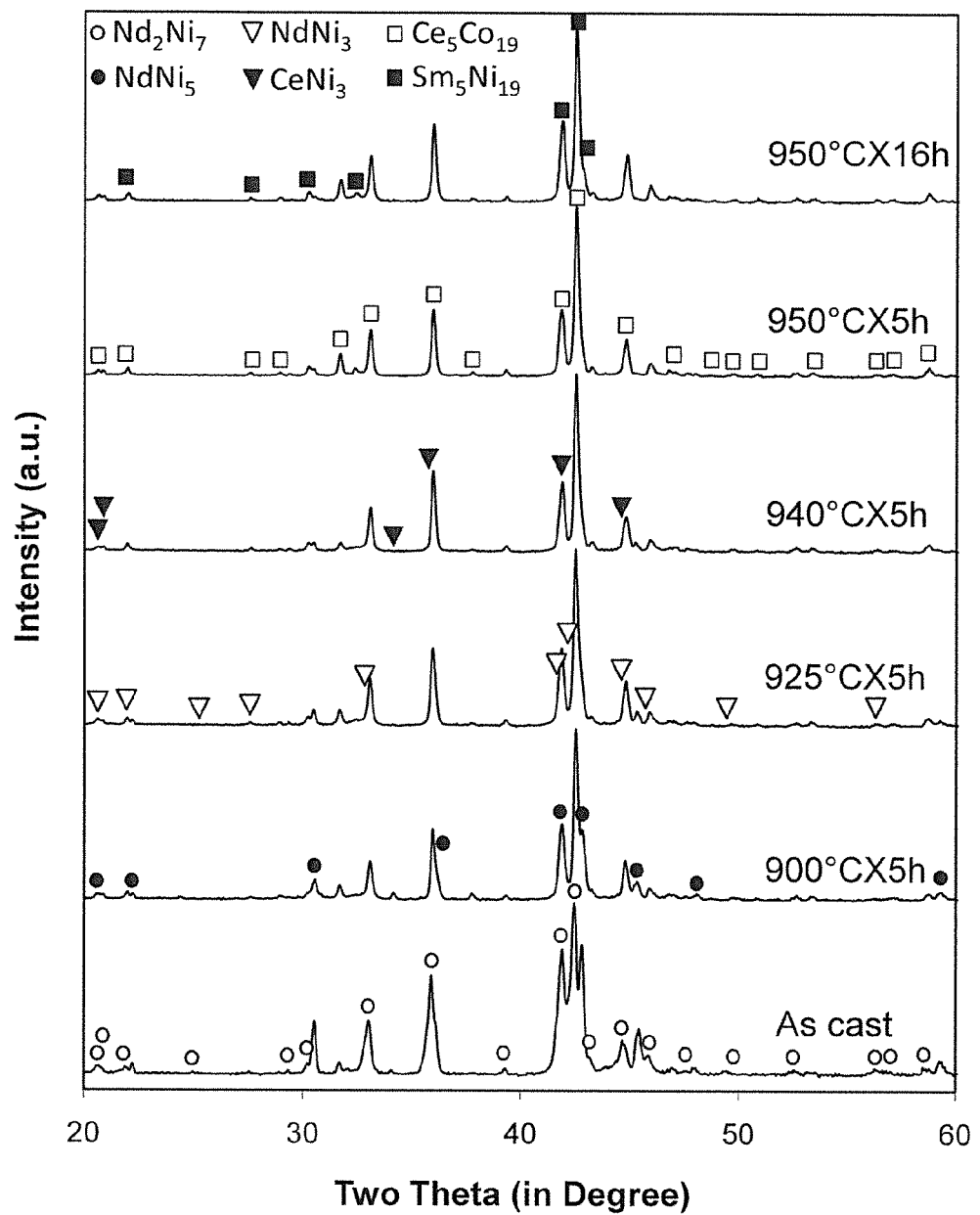
FIG. 1 is a graph showing x-ray diffraction data patterns for a group of materials prepared in accord with the present invention.

The following description of particular embodiment(s) is merely exemplary in nature and is in no way intended to limit the scope of the invention, its application, or uses, which may, of course, vary. The invention is described with relation to the non-limiting definitions and terminology included herein. These definitions and terminology are not designed to function as a limitation on the scope or practice of the invention but are presented for illustrative and descriptive purposes only. While the processes or compositions are described as an order of individual steps or using specific materials, it is appreciated that steps or materials may be interchangeable such that the description of the invention may include multiple parts or steps arranged in many ways as is readily appreciated by one of skill in the art.

A compositionally and structurally disordered alloy is provided having a crystal arrangement of $A_2B_4+x(AB_5)$ where x is from 1 to 4. The alloy includes at least one electrochemically active secondary phase dispersed in the alloy that contributes to the electrochemical performance of the alloy. The alloys provided have utility as an electrochemical material suitable for use in an anode of an electrochemical cell.

The disordered alloys provided are multi-phase containing a main $A_2B_7$ phase and several secondary phases, optionally as $NdNi_3$ (in both $CeNi_3$ and $PuNi_3$ structures), $NdNi_5$, $MgNdNi_4$, $NdNi$, and $Nd_5Ni_{19}$ (in both $Ce_5Co_{19}$ and $Pr_5Co_{19}$ structures). The presence of an ordered structure was previously believed to lead to improved material performance. In contrast to these prior materials, the inventors discovered that a disordered structure with an electrochemically active secondary phase maintains the positive electrode utilization rate and low resistance increase during a 60° C. storage, but also exhibits significantly improved HRD.

It is to be understood that within the context of this description, the hydrogen storage alloy material of the present invention may be of a single chemical composition which is present in one or more phases, or the alloy material may be a composite of two or more differing chemical compositions. The alloys of the present invention include one or more secondary phases that are electrochemically active so as to improve the overall electrochemical performance of the alloy. While not wishing to be bound by speculation, the inventors believe that the combination of a disordered lattice structure and an electrochemically active secondary phase at an amount of 2% to 8% contributes to improved HRD. In specific instances, the alloy has a high-rate dischargeability of 0.977 or greater. In other embodiments, the alloy has a high-rate dischargeability of 0.988 or greater.

As used herein, the term "disordered" is directed to an alloy with a non-uniform distribution of phases in the crystal structure. An example of a non-uniform distribution of phases in a crystal structure is there can be 1, 2, 3, or 4 $AB_5$ layers in between each $A_2B_4$ slabs. Therefore, the average $AB_5$ to $A_2B_4$ ratio is not a whole number.

The level of disorder in a disordered alloy may be measured by the value of x in the formula $A_2B_4+x(AB_5)$. A disordered alloy of such a structure will have an x value that is not a whole number. A method of calculating x for an alloy with a structure having the formula of $A_2B_4+x(AB_5)$ is by calculating the ratio of $A_2B_4$ to $AB_5$ assumed to be 1:x and solving for x. The total A is 2+x. The total B is 4+5x. Thus, the ratio of B/A is modeled by the equation:

$$y=(4+5x)/(2+x) \qquad (I)$$

This leaves x determined by the equation:

$$x=(2y-4)/(5-y)$$

Solving for x in the resulting alloy structure will indicate whether the alloy is disordered by the presence of an uneven distribution of $AB_5$ relative to the $A_2B_4$ phase indicated by a fractional or non-whole number. As an example of an ordered system, an x value of 1 indicates an ordered arrangement where the number of $AB_5$ slabs between each $A_2B_4$ slab is 1.

An x value of 3.24 (as one possible example) indicates disorder in the system by the presence of the fractional value for x. As such, an alloy is provided that has a non-uniform distribution of phases in the crystal structure.

An alloy includes a primary phase and one or more secondary phases. A primary phase is a material phase that is present as a predominant in the overall alloy. In some embodiments, a primary phase is represented by an $A_2B_7$ phase. One or more secondary phases are also present in an alloy. Optionally, the number of secondary phases is 1, 2, 3, 4, 5, 6, 7, or more. At least one secondary phase contributes to the electrochemical performance of an alloy. In some embodiments, an electrochemically active secondary phase is an $AB_5$ phase. By contributing to the electrochemical performance of an alloy, a secondary phase is electrochemically active and functions synergistically with a primary phase to improve one or more measures of electrochemical performance relative to a system that is absent the secondary phase at the active level. One exemplary measure of electrochemical performance is improved HRD relative to a material that is absent such a secondary phase at an active level. It was unexpectedly discovered that in a disordered alloy system, the presence of an electrochemically active secondary phase at a particular level synergistically functions with a primary phase to improve one or more measures of electrochemical performance, illustratively HRD.

An electrochemically active secondary phase is optionally present at a phase abundance of 2% to 8% in the material, or any value or range therebetween. Optionally, a secondary phase is present at a level of 2% to 6%. Optionally, a secondary phase is present at a phase abundance percent level of 2, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, or 6.

An electrochemically active secondary phase present at an active level promotes improved HRD to the overall alloy. HRD is measured as the ratio of capacities measured at 100 mA/g and 8 mA/g. An $A_2B_4$+x($AB_5$) alloy optionally has an HRD in the range of 0.952 to 0.987 at three cycles. Optionally, the HRD is 0.977 or greater at three cycles. Optionally, the HRD is 0.977 or greater at six cycles. An $A_2B_4$+x($AB_5$) alloy optionally has an HRD in the range of 0.988 to 0.989 at six cycles. Optionally, the HRD is 0.988 or greater at six cycles.

An alloy as provided is disordered, optionally with irregular stacking along the c-axis. Such an arrangement is represented by an average crystallite size along the ab-plane that is larger than along the c-axis. Optionally, the average crystallite size along the ab-plane is at least 40% larger than along the c-axis. Optionally, the average crystallite size along the ab-plane is at least 40%, 45%, 50%, 55%, 60%, 65%, 70%, 75%, 80%, 85%, 90%, 95%, 100%, 105%, 110%, 115%, or 120% larger than along the c-axis.

A disordered alloy as provided includes a hydride forming metal component (A). A hydride forming metal component is optionally lanthanum, cerium, praseodymium, neodymium, promethium, samarium, yttrium, or combinations thereof such as a mischmetal. In particular embodiments a hydride forming metal component includes neodymium. A B component includes a metal selected from the group of aluminum, nickel, cobalt, and manganese, or combinations thereof. In particular embodiments, a B component includes nickel. The A component, the B component, or both may be partially substituted by one or more elements that may be titanium, zirconium, vanadium, chromium, cobalt, aluminum, or combinations thereof optionally together with modifier elements which may include silicon, tin, molybdenum, yttrium, antimony, or combinations thereof. In particular embodiments, an A component includes neodymium and a B component includes nickel.

A hydride forming metal component optionally included one or more additive materials. An additive material is optionally included in an A component, a B component, or both. Optionally, an additive is magnesium. The presence of magnesium, for example, at a carefully selected level will promote the desired disordered crystal structure of the alloy. Optionally, magnesium is present at a level of 1 to 10 atomic percent in the overall composition. Optionally, magnesium is present at less than 3.3 atomic percent. Magnesium is optionally present at less than 10, 9, 8, 7, 6, 5, 4, 3.2, 3.1, 3, 2.9, 2.8, 2.7, 2.6, 2.5, 2.4, 2.3, 2.2, 2.1, 2, 1.9, 1.8, 1.7, 1.6, 1.5, or 1 atomic percent. It was found that levels of magnesium of less than 3.2 atomic percent was particularly advantageous in allowing formation of an electrochemically active secondary phase. More preferably, the level of magnesium is from 1 to 3 atomic percent was particularly advantageous. In some embodiments, the level of magnesium is from 2.5 to 2.8 atomic percentage. Some embodiments include magnesium as an additive in an A component, at an overall amount of 1 to 3 atomic percent, optionally 2.5 to 2.8 atomic percentage relative to the composition overall.

Some embodiments include a Nd-only-based $A_2B_4$+x ($AB_5$) alloys where the hydride forming component includes Nd as the sole RE metal, where the averaged x is from 1 to 4, optionally from 2.44 and 2.76. The Nd-only material optionally includes Mg at less than 5 atomic percent, optionally less than 3.4 atomic percent, optionally 2.5 to 2.8 atomic percent. Optionally, the Nd-only based material has a high-rate dischargeability of 0.977 or greater, optionally 0.988 or greater, at cycle six. A Nd-only-based $A_2B_4$+x($AB_5$) alloy may also have a crystallite size on the a-b plane at least 40% larger than along the c-axis. The electrochemically active secondary phase optionally has an $AB_5$ phase present at 2% to 8%, or any value or range therebetween, optionally 2% to 6%.

Some embodiments include a La-only-based $A_2B_4$+x ($AB_5$) alloys where the hydride forming component includes La as the sole RE metal, where the averaged x is from 1 to 4, optionally from 2.44 and 2.76. The La-only material optionally includes Mg at less than 5 atomic percent, optionally less than 3.4 atomic percent, optionally 2.5 to 2.8 atomic percent. Optionally, the La-only based material has a high-rate dischargeability of 0.977 or greater, optionally 0.988 or greater, at cycle six. A La-only-based $A_2B_4$+x($AB_5$) alloy may also have a crystallite size on the a-b plane at least 40% larger than along the c-axis. The electrochemically active secondary phase optionally has an $AB_5$ phase present at 2% to 8%, or any value or range therebetween, optionally 2% to 6%.

Some embodiments include a Sm-only-based $A_2B_4$+x ($AB_5$) alloys where the hydride forming component includes Sm as the sole RE metal, where the averaged x is from 1 to 4, optionally from 2.44 and 2.76. The Sm-only material optionally includes Mg at less than 5 atomic percent, optionally less than 3.4 atomic percent, optionally 2.5 to 2.8 atomic percent. Optionally, the Sin-only based material has a high-rate dischargeability of 0.977 or greater, optionally 0.988 or greater, at cycle six. A Sin-only-based $A_2B_4$+x($AB_5$) alloy may also have a crystallite size on the a-b plane at least 40% larger than along the c-axis. The electrochemically active secondary phase optionally has an $AB_5$ phase present at 2% to 8%, or any value or range therebetween, optionally 2% to 6%.

Some embodiments include a (La, Pr, Nd)-mixed $A_2B_4$+x ($AB_5$) alloys where the hydride forming component includes (La, Pr, Nd)-mixed material as the RE metal, where the averaged x is from 1 to 4, optionally from 2.44 and 2.76. The (La, Pr, Nd)-mixed material optionally includes Mg at less than 5 atomic percent, optionally less than 3.4 atomic percent, optionally 2.5 to 2.8 atomic percent. Optionally, the (La, Pr, Nd)-mixed material has a high-rate dischargeability of 0.977 or greater, optionally 0.988 or greater, at cycle six. A (La, Pr, Nd)-mixed $A_2B_4+x(AB_5)$ alloy may also have a crystallite size on the a-b plane at least 40% larger than along the c-axis. The electrochemically active secondary phase optionally has an $AB_5$ phase present at 2% to 8%, or any value or range therebetween, optionally 2% to 6%.

Some embodiments include a (La, Pr, Sm)-mixed $A_2B_4+x(AB_5)$ alloys where the hydride forming component includes (La, Pr, Sm)-mixed RE metal, where the averaged x is from 1 to 4, optionally from 2.44 and 2.76. The (La, Pr, Sm)-mixed material optionally includes Mg at less than 5 atomic percent, optionally less than 3.4 atomic percent, optionally 2.5 to 2.8 atomic percent. Optionally, the (La, Pr, Sm)-mixed based material has a high-rate dischargeability of 0.977 or greater, optionally 0.988 or greater, at cycle six. A (La, Pr, Sm)-mixed $A_2B_4+x(AB_5)$ alloy may also have a crystallite size on the a-b plane at least 40% larger than along the c-axis. The electrochemically active secondary phase optionally has an $AB_5$ phase present at 2% to 8%, or any value or range therebetween, optionally 2% to 6%.

Some embodiments include a (La, Pr, Nd, Sm)-mixed $A_2B_4+x(AB_5)$ alloys where the hydride forming component includes (La, Pr, Nd, Sm)-mixed RE metal, where the averaged x is from 1 to 4, optionally from 2.44 and 2.76. The (La, Pr, Nd, Sm)-mixed material optionally includes Mg at less than 5 atomic percent, optionally less than 3.4 atomic percent, optionally 2.5 to 2.8 atomic percent. Optionally, the (La, Pr, Nd, Sm)-mixed material has a high-rate dischargeability of 0.977 or greater, optionally 0.988 or greater, at cycle six. A (La, Pr, Nd, Sm)-mixed $A_2B_4+x(AB_5)$ alloy may also have a crystallite size on the a-b plane at least 40% larger than along the c-axis. The electrochemically active secondary phase optionally has an $AB_5$ phase present at 2% to 8%, or any value or range therebetween, optionally 2% to 6%.

Some embodiments include a (La, Ce, Pr, Nd)-mixed $A_2B_4+x(AB_5)$ alloys where the hydride forming component includes (La, Ce, Pr, Nd)-mixed RE metal, where the averaged x is from 1 to 4, optionally from 2.44 and 2.76. The (La, Ce, Pr, Nd)-mixed material optionally includes Mg at less than 5 atomic percent, optionally less than 3.4 atomic percent, optionally 2.5 to 2.8 atomic percent. Optionally, the (La, Ce, Pr, Nd)-mixed material has a high-rate dischargeability of 0.977 or greater, optionally 0.988 or greater, at cycle six. A (La, Ce, Pr, Nd)-mixed $A_2B_4+x(AB_5)$ alloy may also have a crystallite size on the a-b plane at least 40% larger than along the c-axis. The electrochemically active secondary phase optionally has an $AB_5$ phase present at 2% to 8%, or any value or range therebetween, optionally 2% to 6%.

Some embodiments include a (La, Ce, Pr, Nd, Sm)-mixed $A_2B_4+x(AB_5)$ alloys where the hydride forming component includes (La, Ce, Pr, Nd, Sm)-mixed RE metal, where the averaged x is from 1 to 4, optionally from 2.44 and 2.76. The (La, Ce, Pr, Nd, Sm)-mixed material optionally includes Mg at less than 5 atomic percent, optionally less than 3.4 atomic percent, optionally 2.5 to 2.8 atomic percent. Optionally, the (La, Ce, Pr, Nd, Sm)-mixed material has a high-rate dischargeability of 0.977 or greater, optionally 0.988 or greater, at cycle six. A (La, Ce, Pr, Nd, Sm)-mixed $A_2B_4+x(AB_5)$ alloy may also have a crystallite size on the a-b plane at least 40% larger than along the c-axis. The electrochemically active secondary phase optionally has an $AB_5$ phase present at 2% to 8%, or any value or range therebetween, optionally 2% to 6%.

It will be appreciated by one of ordinary skill in the art that the invention includes many arrangements including many components or parameters as described herein that are each a compositionally and structurally disordered $A_2B_4+x(AB_5)$ alloy where x is a number between 1 and 4 and which include at least one electrochemically active secondary phase. It is appreciated that any of the taught or equivalent primary or secondary phases or number thereof or amount thereof, the levels of HRD, crystal stacking parameters, hydride forming metal components, B components, or additives are each combinable in any configuration and in any arrangement and are all in part or in whole understood embodiments of the invention.

A compositionally and structurally disordered $A_2B_4+x(AB_5)$ alloy is formed by annealing an ingot under particular conditions. Annealing is used to tailor the type and amount of primary phase relative to secondary phase. An ingot is prepared by methods well recognized in the art such as by the combination of raw materials that are melted by high-frequency induction. Processes of forming a compositionally and structurally disordered $A_2B_4+x(AB_5)$ alloy are provided whereby an ingot of a hydride forming metal as an A component, a B component, and optionally including one or more additives or modifier elements, are annealed at an annealing temperature of 900° C. or greater for an annealing time to produce the compositionally and structurally disordered $A_2B_4+x(AB_5)$ alloy.

An annealing temperature used in a process is 900° C. or greater. Optionally, an annealing temperature is from 925° C. to 940° C. It has been found that an annealing temperature of from 925° C. to 940° C. will produce an alloy with optimum electrochemical properties. Optionally, an annealing temp is 925, 930, 935, 940, 945, or 950° C. An annealing temperature is applied to an ingot for an annealing time. At an annealing temperature of 925° C. to 940° C., an annealing time is optionally from 3 hours to 15 hours, or any value or range therebetween. Optionally, an annealing time is from 4 hours to 10 hours. Optionally, an annealing time is from 4 hours to 6 hours. Optionally, an annealing time is 3, 4, 5, 6, 7, 8, 9, 10, 11, 12, 13, 14, or 15 hours.

The combination of annealing temperature and annealing time will produce an alloy with the desired structural disorder, level of electrochemically active secondary phase, and optimal electrochemical characteristics. In some embodiments, HRD is optimized by annealing for an annealing time from 3 to 15 hours, optionally 4-7 hours, at an annealing temperature of 925° C. to 940° C.

The tailored annealing will produce a compositionally and structurally disordered $A_2B_4+x(AB_5)$ alloy with optimal and unexpectedly high HRD.

Various aspects of the present invention are illustrated by the following non-limiting examples. The examples are for illustrative purposes and are not a limitation on any practice of the present invention. It will be understood that variations and modifications can be made without departing from the spirit and scope of the invention.

EXPERIMENTAL

A series of MH alloys were prepared by various annealing conditions and evaluated in connection with an experimental series illustrating the principles of the present invention. The alloys were of the basic type: $(Nd_{0.87}Mg_{0.12}Zr_{0.01})(Ni_{0.952}Al_{0.046}Co_{0.002})_{3.74}$. The selection of the stoichiometry at 3.74 was included to take the advantage of a relatively higher equilibrium plateau pressure and the steeper take-off angle in the α-phase of the PCT diagram. The materials included small amounts of Zr and Co for the purpose of improving both cycle life and activation of the resulting alloys. The materials were prepared by an induction melting process as is known in the art.

The ingot was divided into several 2-kg lots are then subjected to one of a various selection of annealing conditions performed in 1 atm of argon. Samples were annealed at an annealing temperature of 900, 925, 940, or 950° C. for an annealing time of 5 hours or 16 hours.

ICP Analyses

The chemical composition of the prepared alloy samples was determined using a Varian Liberty 100 inductively coupled plasma optical emission spectrometer (ICP-OES) in accord with principles known in the art. The ICP results from ingots before and after annealing in atomic percentage are illustrated in Table 1.

ondary phases include $NdNi_3$ (in both $PuNi_3$ and $CeNi_3$ structures) and $Nd_5Ni_{19}$ (in both $Ce_5Co_{19}$ and $Pr_5Co_{19}$ structures). All of these phases represent different alternating $A_2B_4$ and $AB_5$ stacking sequences. The $MgNdNi_4$ phase reported before in a similar material as one of the major secondary phases [K. Young, A. Wu, Z. Qiu, J. Tan, W. Mays, *Int. J. Hydrogen Energy*, 2012; 37:9882] was not found in the present materials. It is believed that this phase is absent due to the reduction of magnesium content from 3.4 to 2.8 atomic percentage.

Lattice constants a and c from the main $Nd_2Ni_7$ phase for each sample are listed in Table 2 together with the c/a ratio and unit cell volume.

TABLE 2

$Nd_2Ni_7$ lattice constants and ratios, unit cell volumes, and phase abundances of alloys from XRD analysis.

| Alloy | a (Å) | c (Å) | c/a | Unit cell volume (Å³) | $Nd_2Ni_7$ % | $NdNi_5$ % | $PuNi_3$ % | $CeNi_3$ % | $Ce_5Co_{19}$ % | $Pr_5Co_{19}$ % |
|---|---|---|---|---|---|---|---|---|---|---|
| As-cast | 5.001 | 24.339 | 4.867 | 527.17 | 76.9 | 21 | 1 | 0.8 | 0.2 | 0.1 |
| 900° C. × 5 h | 5.001 | 24.329 | 4.865 | 526.95 | 89.3 | 8 | 0.8 | 1.0 | 0.8 | 0.1 |
| 925° C. × 5 h | 4.999 | 24.320 | 4.865 | 526.33 | 92.5 | 6 | 0.6 | 0.2 | 0.4 | 0.3 |
| 940° C. × 5 h | 4.999 | 24.332 | 4.867 | 526.59 | 97.1 | 2 | 0.2 | 0.1 | 0.4 | 0.2 |
| 950° C. × 5 h | 5.000 | 24.328 | 4.866 | 526.72 | 97.0 | 1.5 | 0.2 | 0.0 | 0.6 | 0.7 |
| 950° C. × 16 h | 4.999 | 24.330 | 4.867 | 526.55 | 97.3 | 1 | 0.3 | 0.0 | 0.6 | 0.8 |

TABLE 1

Designed compositions and ICP compositional results in atomic percent.

| | Nd | Zr | Mg | Ni | Co | Al | Fe | B/A |
|---|---|---|---|---|---|---|---|---|
| Design | 18.4 | 0.2 | 2.5 | 75.1 | 0.2 | 3.6 | 0.0 | 3.74 |
| As-cast | 18.5 | 0.2 | 2.8 | 74.5 | 0.2 | 3.7 | 0.1 | 3.65 |
| 900° C. × 5 h | 18.4 | 0.2 | 2.9 | 74.5 | 0.2 | 3.7 | 0.1 | 3.65 |
| 925° C. × 5 h | 18.1 | 0.2 | 2.8 | 75.2 | 0.2 | 3.4 | 0.1 | 3.74 |
| 940° C. × 5 h | 18.2 | 0.2 | 2.8 | 75.0 | 0.2 | 3.5 | 0.1 | 3.72 |
| 950° C. × 5 h | 18.1 | 0.2 | 2.8 | 75.2 | 0.2 | 3.4 | 0.1 | 3.74 |
| 950° C. × 16 h | 18.1 | 0.2 | 2.8 | 75.2 | 0.2 | 3.4 | 0.1 | 3.74 |

The as-cast composition is in excellent agreement with the composition as designed with the minor exception of a small amount of Fe that was picked up from the steel mold and a small additional amount of Mg resulting from overcompensation of anticipated Mg loss during ingot formation. Additional Mg loss was not observed even following annealing at 950° C. for 16 hours. The final B/A ratios after annealing are very close to the target of 3.74 with the exception of the as-cast and sample annealed at the lowest temperature, which showed a slightly lower value (3.65). This small deviation is believed to result from the compositional inhomogeneity with the conventional melt-and-cast method employed in this study.

XRD Analyses

Microstructure of the alloys was studied utilizing a Philips X'Pert Pro x-ray diffractometer. The XRD patterns of the six samples (as-cast, annealed at 900, 925, 940, or 950° C. for 5 h, or 950° C. for 16 h) are shown in FIG. 1. All samples are dominated by a $Nd_2Ni_7$ structure. Several secondary phases are observed with the $NdNi_5$ serving as the main secondary phase. The abundance of the $NdNi_5$ phase reduces with the increase in annealing temperature and duration. Other sec- The changes in the lattice constants with various annealing conditions are very small. The only noticeable change is the decrease in the unit cell volume with annealing at any condition.

Also illustrated in Table 2 are the phase abundances as analyzed by Jade 9 software. An increase in annealing temperature produces an increase in the main $Nd_2Ni_7$ phase and $Pr_5Co_{19}$ phase. The relative abundance of all other phases decreases with an increase in annealing temperature. Annealing at 900° C. for 5 h produced an increase in the abundance of the $Nd_2Ni_7$ phase from 76.9% to 89.3%. Increasing the annealing temperature to 940° C. increased the $Nd_2Ni_7$ phase to over 97%. Further increasing the annealing temperature (950° C.) or extending the annealing time to 16 h did not significantly further change the $Nd_2Ni_7$ phase abundance. The $NdNi_5$ secondary phase, which possesses the highest Ni-content, is the major secondary phase in both the as-cast and annealed samples. The alloy of this phase is expected to have a higher catalytic ability when reacting with hydrogen based on its relatively higher hydrogen equilibrium pressure. The abundance of the $NdNi_5$ secondary phase decreased when annealing temperature is increased. Further increasing the annealing time to 16 hours further reduced the abundance of this phase. All other $AB_3$ and $A_5B_{19}$ secondary phases are MH alloys capable of storing considerable amounts of hydrogen. Their abundances are typically less or equal to 1 wt. % and may not be as important as the $NdNi_5$ phase considering both their Ni-content and abundance.

Phase Distribution and Composition

The alloy phase distribution and composition were examined using a JEOL-JSM6320F scanning electron microscope with energy dispersive spectroscopy (EDS) capability. Samples were mounted and polished on epoxy blocks, rinsed and dried before entering the SEM chamber. Back scattering electron images are presented in FIG. 2A-F. Several areas are chosen for study by EDS which are each depicted with a numeral in FIG. 2A-F. The results of the EDS measurements are illustrated in Table 3.

TABLE 3

Summary of EDS results. The main $Nd_2Ni_7$ phases are in bold.

Figure 2A:
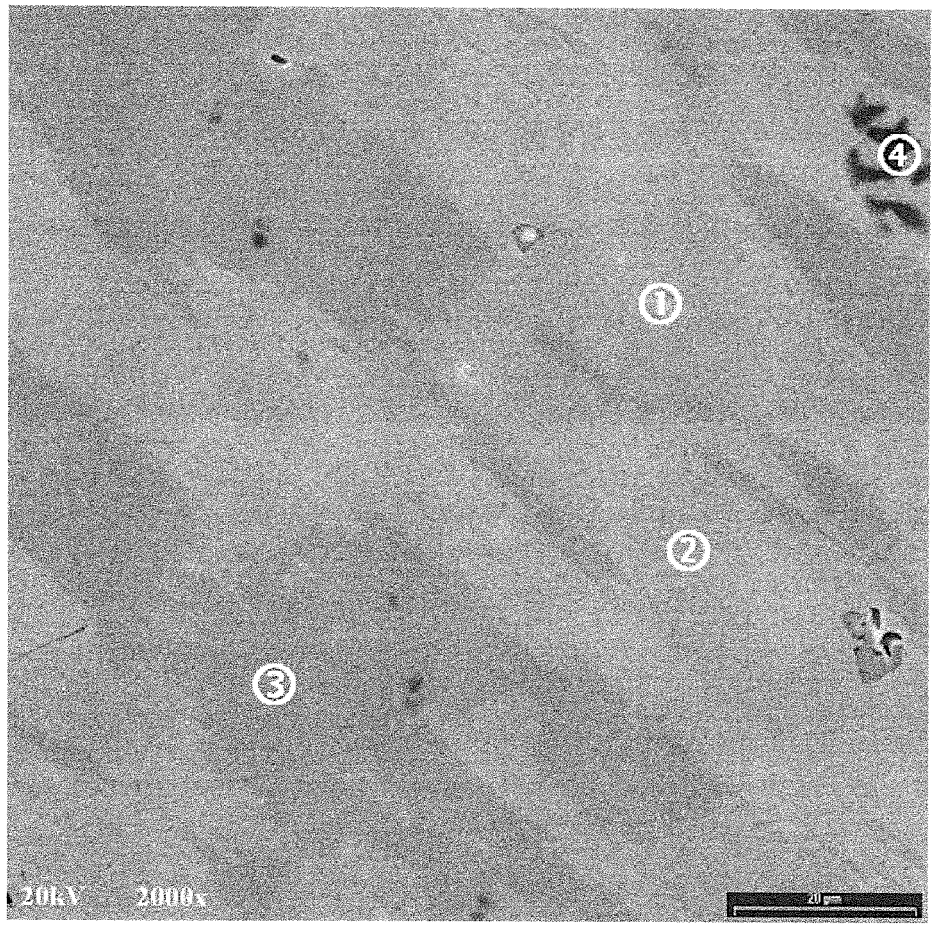
FIG. 2A illustrates scanning electron microscope images of a group of materials according to the invention.
Figure 2B:
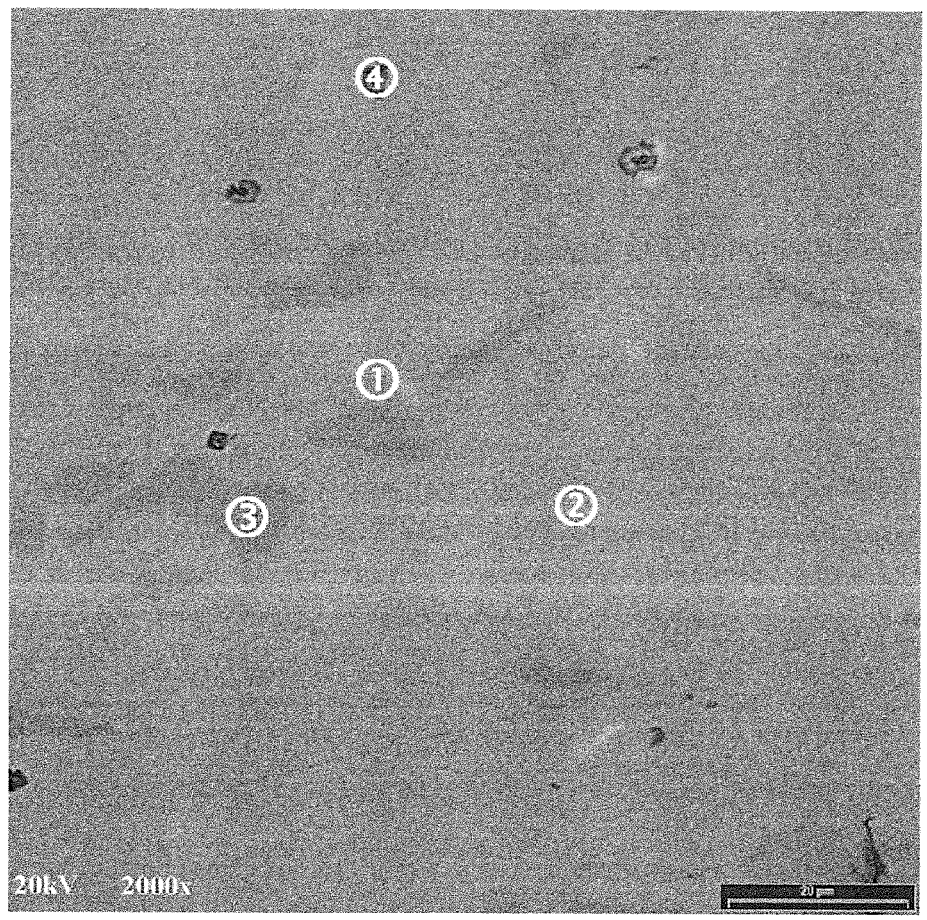
FIG. 2B further illustrates scanning electron microscope images of a group of materials according to the invention.
Figure 2C:
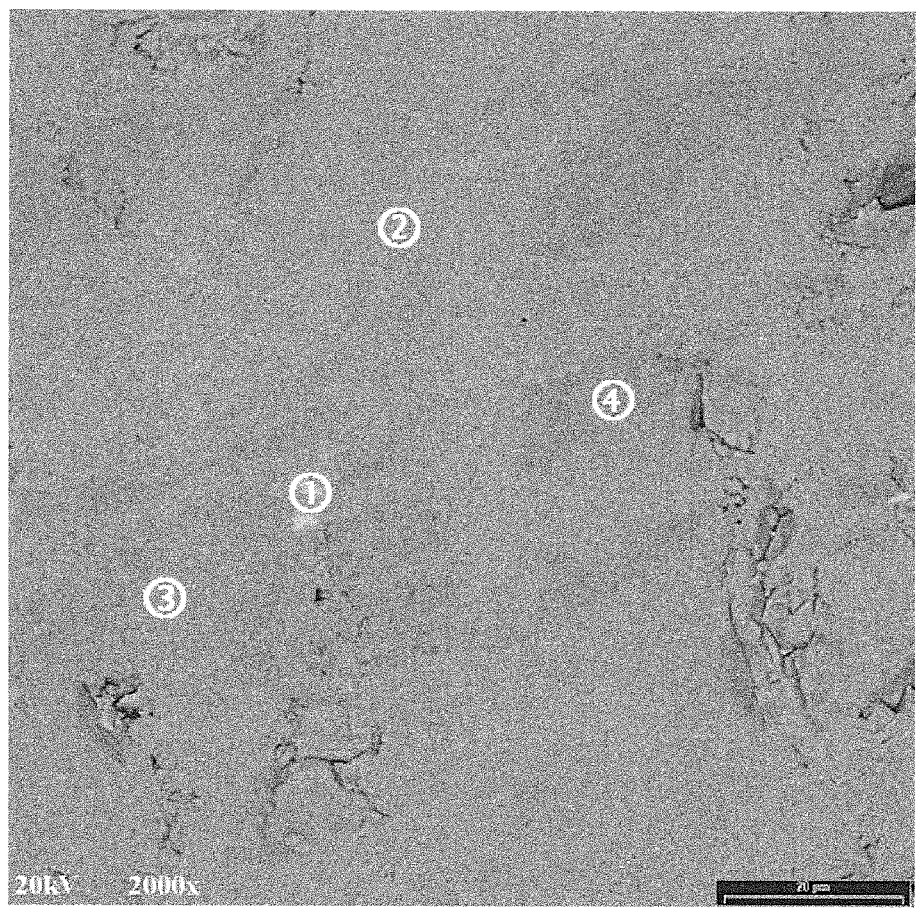
FIG. 2C further illustrates scanning electron microscope images of a group of materials according to the invention.
Figure 2D:
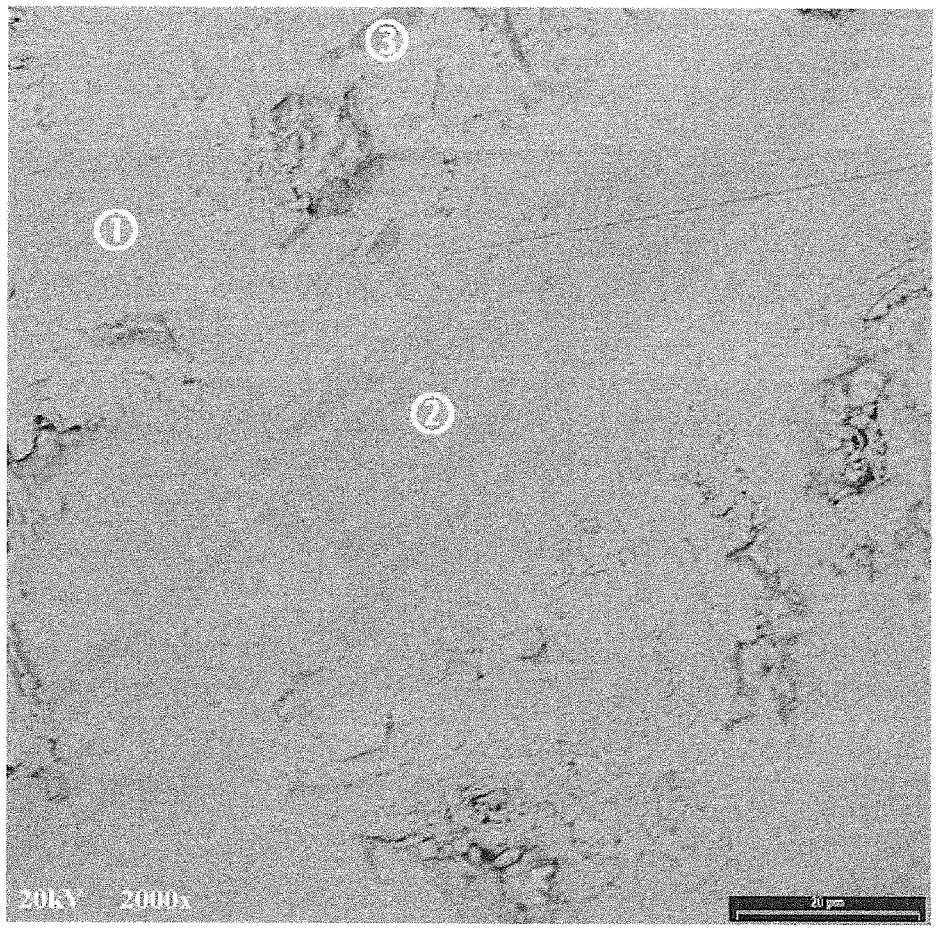
FIG. 2D further illustrates scanning electron microscope images of a group of materials according to the invention.
Figure 2E:
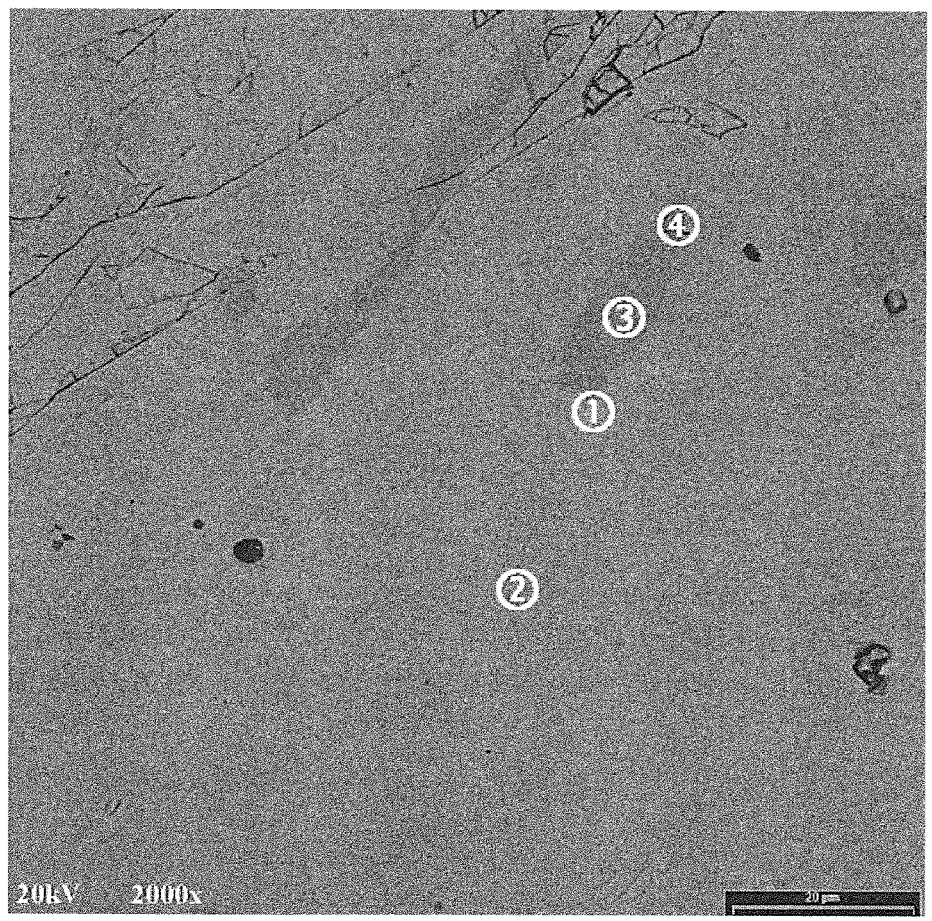
FIG. 2E further illustrates scanning electron microscope images of a group of materials according to the invention.
Figure 2F:
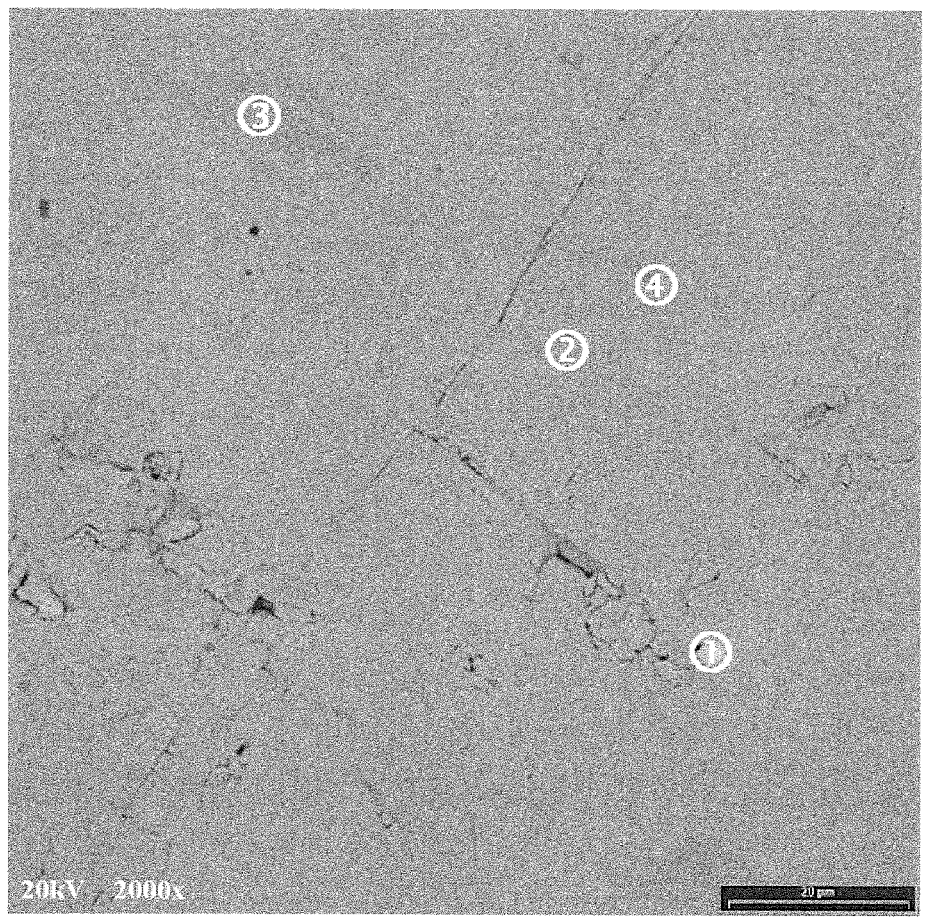
FIG. 2F further illustrates scanning electron microscope images of a group of materials according to the invention.

| | | Nd | Zr | Mg | Ni | Al | B/A | Phase |
|---|---|---|---|---|---|---|---|---|
| A (as cast) | FIG. 2a-1 | 24.8 | 0.1 | 2.3 | 71.1 | 1.7 | 2.7 | $Nd_2Ni_7$ |
| | 2 | 23.5 | 0.1 | 3.6 | 71.7 | 1.2 | 2.7 | $Nd_2Ni_7$ |
| | 3 | 19.4 | 0.1 | 0.3 | 77.7 | 2.6 | 4.0 | $NdNi_5$ |
| | 4 | 0.7 | 96.7 | 0.1 | 2.5 | 0.0 | 0.0 | $ZrO_2$ |
| B (900° C. × 5 h) | FIG. 2b-1 | 22.3 | 0.0 | 1.4 | 74.7 | 1.4 | 3.2 | $Nd_2Ni_7$ |
| | 2 | 22.2 | 0.1 | 2.4 | 73.6 | 1.8 | 3.1 | $Nd_2Ni_7$ |
| | 3 | 19.9 | 0.1 | 0.5 | 75.9 | 3.7 | 3.9 | $NdNi_5$ |
| | 4 | 0.9 | 97.1 | 0.1 | 2.0 | 0.0 | 0.0 | $ZrO_2$ |
| C (925° C. × 5 h) | FIG. 2c-1 | 28.8 | 0.0 | 1.4 | 67.8 | 2.0 | 2.3 | $NdNi_3$ |
| | 2 | 22.3 | 0.1 | 1.6 | 74.9 | 1.2 | 3.2 | $Nd_2Ni_7$ |
| | 3 | 19.6 | 0.0 | 0.3 | 76.6 | 3.4 | 4.0 | $NdNi_5$ |
| | 4 | 20.3 | 0.0 | 0.3 | 76.0 | 3.4 | 3.9 | $NdNi_5$ |
| D (940° C. × 5 h) | FIG. 2d-1 | 21.9 | 0.3 | 1.7 | 74.2 | 1.9 | 3.2 | $Nd_2Ni_7$ |
| | 2 | 21.5 | 0.2 | 1.7 | 74.5 | 1.7 | 3.3 | $Nd_2Ni_7$ |
| | 3 | 21.4 | 0.2 | 1.8 | 74.7 | 2.1 | 3.3 | $Nd_2Ni_7$ |
| E (950° C. × 5 h) | FIG. 2e-1 | 28.8 | 0.0 | 1.4 | 67.8 | 2.0 | 2.3 | $NdNi_3$ |
| | 2 | 22.3 | 0.1 | 1.6 | 74.9 | 1.2 | 3.2 | $Nd_2Ni_7$ |
| | 3 | 19.6 | 0.0 | 0.3 | 76.6 | 3.4 | 4.0 | $NdNi_5$ |
| | 4 | 20.3 | 0.0 | 0.3 | 76.0 | 3.4 | 3.9 | $NdNi_5$ |
| F (950° C. × 16 h) | FIG. 2f-1 | 21.5 | 0.1 | 2.1 | 73.9 | 2.1 | 3.2 | $Nd_2Ni_7$ |
| | 2 | 21.8 | 0.1 | 1.8 | 73.7 | 1.8 | 3.2 | $Nd_2Ni_7$ |
| | 3 | 21.1 | 0.1 | 2.3 | 74.0 | 2.3 | 3.2 | $Nd_2Ni_7$ |
| | 4 | 21.3 | 0.1 | 2.2 | 74.0 | 2.2 | 3.2 | $Nd_2Ni_7$ |

Small inclusions of $ZrO_2$ (FIG. 2A at 4 and FIG. 2B at 4) and metallic-Nd (FIG. 2C at 1) were observed but are not considered important to the overall material properties. In the as-cast sample, grains of darker contrast with B/A ratio of about 4.0 and brighter matrix with B/A ratios of about 2.7 are assigned to $NdNi_5$ and $Nd_2Ni_7$ phases, respectively (FIG. 2A). The large departures from the stoichiometric ratios (5.0 and 3.5) indicate wide solubilities of both phases. When the ingot was annealed at 900° C. for 5 h, the $NdNi_5$ phase became smaller and it's B/A ratio remained at about 3.9. After annealing, the B/A ratio in the main phase increased from 2.7 to 3.1 (3.2). With increasing annealing temperature, the amount of $NdNi_5$ reduced and the B/A ratio in the main phase approached 3.2-3.3.

Figure 3:
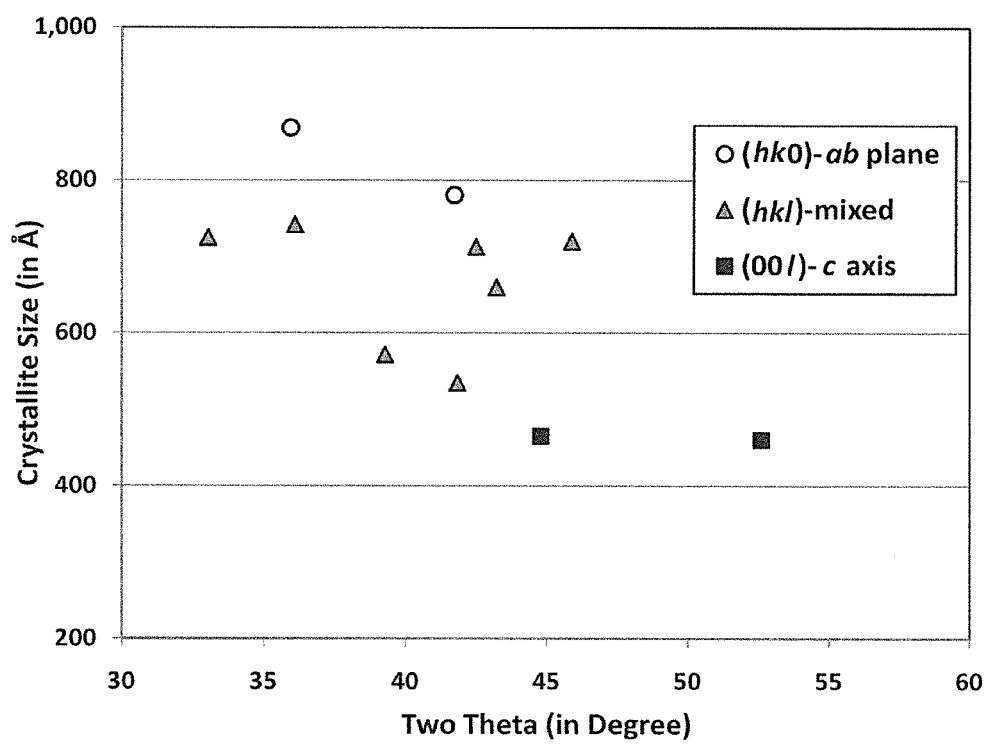
FIG. 3 illustrates the crystallite sizes estimated from the full-width at half-maximum of the XRD peaks from a material according to the invention annealed at 950° C. for 16 hours.

Without being limited to one particular theory, one possible explanation for the intermediate stoichiometries may be the stacking sequence along the c-axis. An $AB_3$ structure is composed of 1 $AB_5$ block sandwiched with 1 $A_2B_4$ block, while an $A_2B_7$ structure is composed of 2 $AB_5$ blocks and 1 $A_2B_4$ block [T. Ozaki, et al., J. Alloys Compd., 2007; 620: 446-447]. A stoichiometry of 3.3 may correspond to a randomly ordered (e.g. disordered) 1 or 2 $AB_5$ blocks between each $A_2B_4$ block. The crystallite sizes estimated from the full-width at half-maximum of the XRD peaks from a sample annealed at 950° C. for 16 h are shown in FIG. 3. The average crystallite size on the ab-plane is longer than that along the c-axis. Crystallite sizes along other orientations fall in an intermediate range. In this example, the stacking sequence along c-axis is not as orderly as other orientations.

Gaseous Phase Characteristics

Figure 4A:
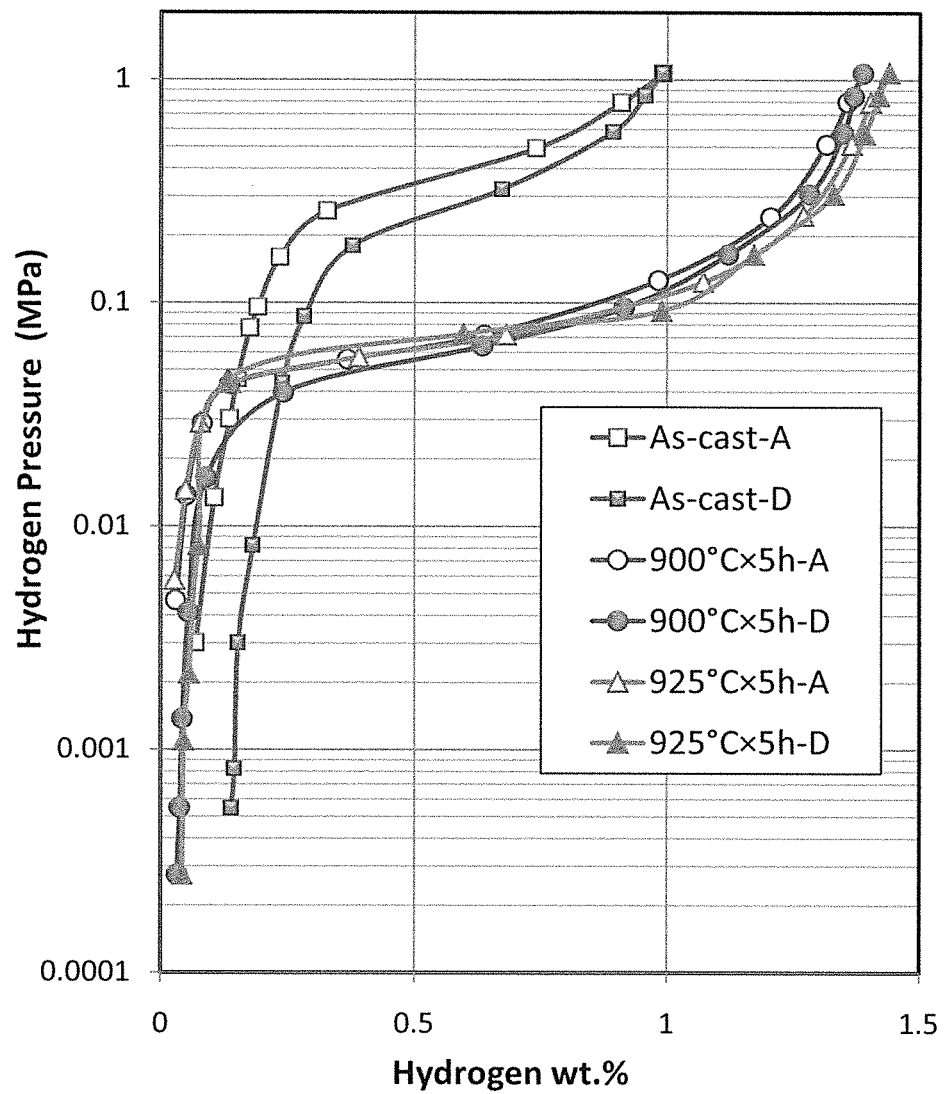
FIG. 4A illustrates gaseous phase hydrogen storage characteristics of various alloy materials according to the invention.
Figure 4B:
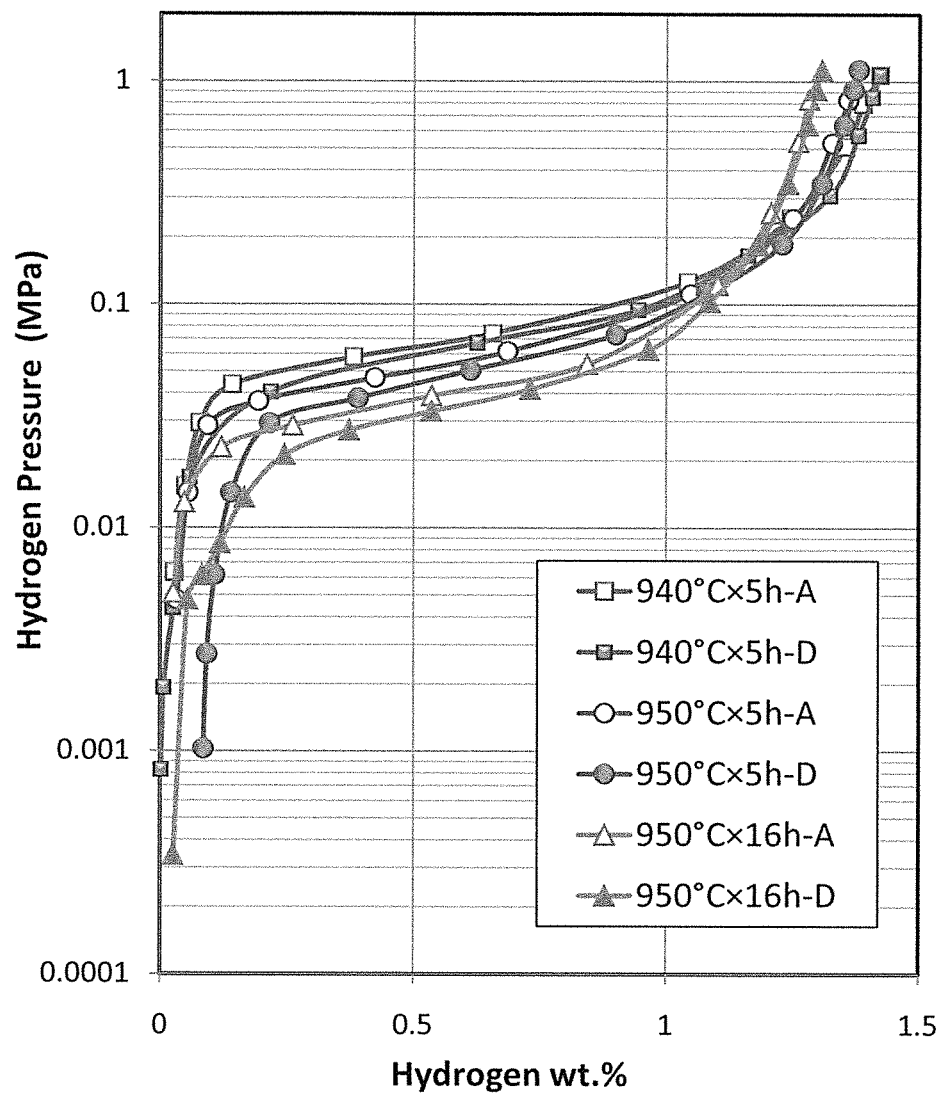
FIG. 4B further illustrates gaseous phase hydrogen storage characteristics of various alloy materials according to the invention.

The gaseous phase hydrogen storage characteristics of each sample were measured using a Suzuki-Shokan multi-channel pressure-concentration-temperature (PCT) system. In the PCT analysis each sample was first activated by a 2 hour thermal cycle ranging between 300° C. and room temperature at 25 atm $H_2$ pressure. The PCT isotherms at 30° C. and 60° C. were then measured. The resulting absorption and desorption isotherms are presented in FIG. 4 and the information obtained is summarized in Table 4.

TABLE 4

Summary of gaseous phase hydrogen storage properties of as-cast and annealed alloys measured at 30° C.

| Alloy | Max. H-storage (wt. %) | Rev. H-storage (wt. %) | Mid-point pressure at Des. (MPa) | Slope factor | Hysteresis@0.5 wt. % |
|---|---|---|---|---|---|
| As-cast | 0.99 | 0.85 | 0.27 | 0.70 | 0.40 |
| 900° C. × 5 h | 1.39 | 1.36 | 0.072 | 0.93 | 0.13 |
| 925° C. × 5 h | 1.44 | 1.40 | 0.079 | 0.94 | 0.05 |
| 940° C. × 5 h | 1.42 | 1.42 | 0.074 | 0.94 | 0.10 |
| 950° C. × 5 h | 1.38 | 1.30 | 0.060 | 0.95 | 0.15 |
| 950° C. × 16 h | 1.31 | 1.28 | 0.038 | 0.95 | 0.16 |

An increase in main phase abundance produced increases in both the maximum and reversible hydrogen storage capacities after annealing at 900° C. and 925° C. Increasing the annealing temperature to 940° C. and 950° C. reduced both capacities due to reduction in the $NdNi_5$ secondary phase abundance. The $NdNi_5$ phase is an electrochemically active phase with a larger nickel content and corresponding weaker metal-hydrogen bond.

The equilibrium plateau pressure, defined as the mid-point of the desorption isotherm, decreased substantially after annealing. Annealing conditions at higher temperature and/or longer duration produced a drop in the mid-point pressure indicating an increase in the average metal-hydrogen bond strength.

The degree of disorder is represented by the slope factor (SF), which is defined as the ratio of the storage capacity between 0.01 and 0.5 MPa to the reversible capacity. The SF of each alloy is also listed in Table 4. Annealing increased the alloy uniformity and consequently contributed to a flatter isotherm with a larger SF value.

The hysteresis of the PCT isotherm is defined as $\ln(P_a/P_d)$, where $P_a$ and $P_d$ are the absorption and desorption equilibrium pressures at the mid-point of desorption isotherm, respectively. The hysteresis can be used to predict the pulverization rate of the alloy during cycling [59]. Alloys with larger hysteresis have higher pulverization rates during hydriding/dehydriding cycles. The hysteresis of each alloy is also listed in Table 4. From the hysteresis, a large increase in cycle stability is expected by annealing. Increasing the annealing temperature correlated to a slightly increased hysteresis.

Electrochemical Characterization

The discharge capacity of each alloy was measured in a flooded-cell configuration against a partially pre-charged $Ni(OH)_2$ positive electrode. For the half-cell electrochemical studies, each ingot was first ground and then passed through a 200-mesh sieve. The sieved powder was then compacted onto an expanded nickel metal substrate by a 10-ton press to form a test electrode (about 1 $cm^2$ in area and 0.2 mm thick) without using any binder. This allowed improved measurement of the activation behavior. Discharge capacities of the resulting small-sized electrodes were measured in a flooded cell configuration using a partially pre-charged $Ni(OH)_2$ pasted electrode as the positive electrode and a 6M KOH solution as the electrolyte. The system was charged at a current density of 100 mA/g for 5 h and then discharged at a current density of 100 mA/g until a cut-off voltage of 0.9 V was reached. The system was then discharged at a current density of 24 mA/g until a cut-off voltage of 0.9 V was reached and finally discharged at a current density of 8 mA/g until a cut-off voltage of 0.9 V was reached.

Figure 5A:
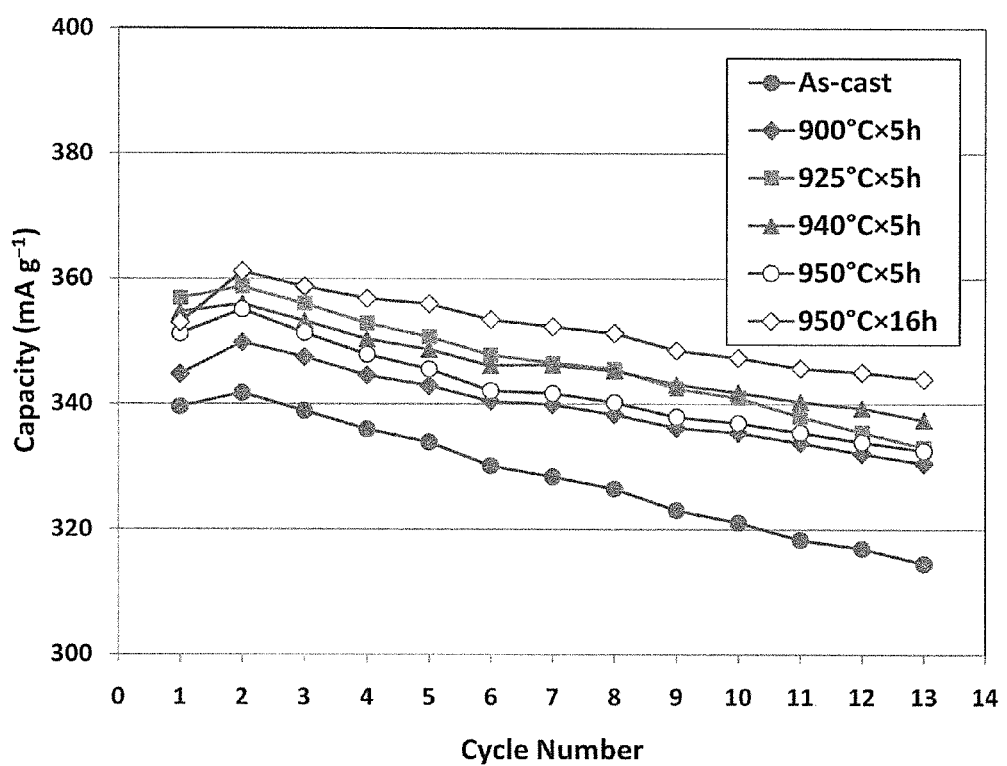
FIG. 5A illustrates the capacity of various alloy materials according to the invention when used as an anode in a flooded-cell configuration.
Figure 5B:
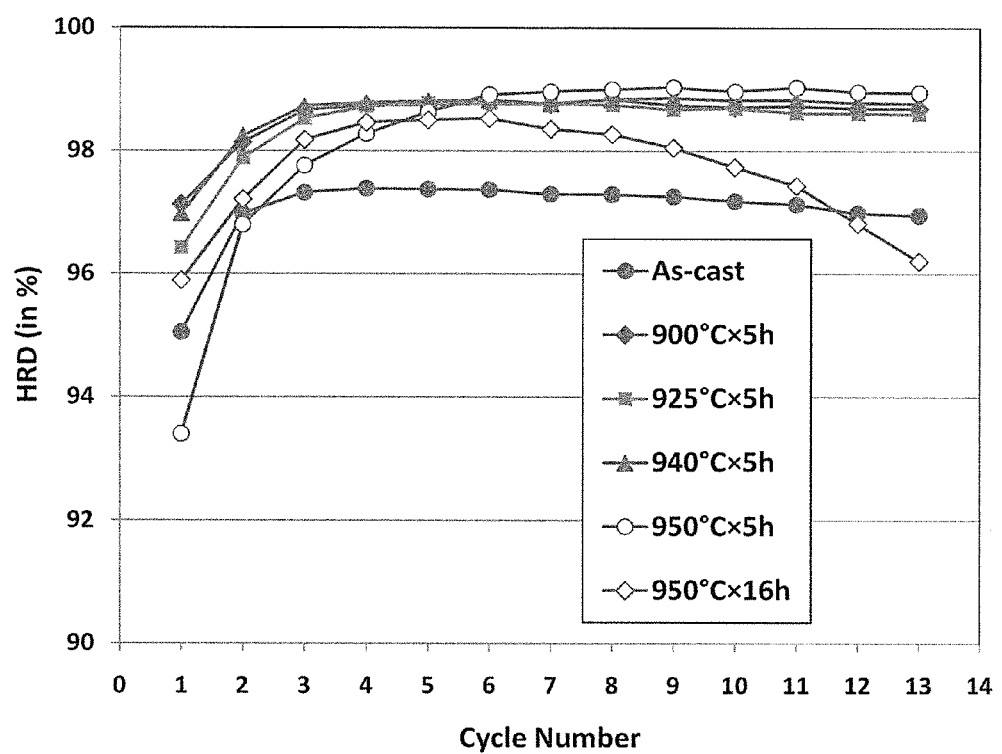
FIG. 5B illustrates the HRD of various alloy materials according to the invention when used as an anode in a flooded-cell configuration.

The obtained full capacities (8 mA/g) and HRD (as defined by the ratio in capacities measured at 100 and 8 mA/g) from the first thirteen cycles are plotted in FIGS. 5A and 5B, respectively. Samples annealed at 900° C. and 925° C. have the fastest capacity activation. While the annealing at lower temperatures helped the activation, those annealing at 940° C. and 950° C. were more difficult to activate.

The full and high-rate capacities are compared in Table 5.

harder to activate surface. Comparing HRD with D and $I_o$, suggests that in these $NdNi_{3.74}$ samples, the HRD characteristic may be more dominated by the surface property ($I_o$) than the bulk (D).

Sealed cell tests were performed in C-sized cylindrical batteries. C-size Ni/MH batteries were made with the dry compacted negative electrodes, pasted $Ni(OH)_2$ counter electrodes, 6M KOH electrolyte, and grafted PP/PE separators. The design was positive-limited with a negative-to-positive capacity ratio of 1.6 to maintain a good balance between the over-charge reservoir and the over-discharge reservoir. The nominal capacity of this design is about 4.6 Ah. Charge retention was measured by taking the full discharge capacity at 0.2 C rate after being fully charged at 0.1 C rate first and then stored at room temperature for 30 days. This remaining capacity at 0.2 C rate was normalized by the original capacity measured at 0.2 C discharge rate before the storage. Results from the 30-day charge retention experiment are summarized in Table 5. An increase in the annealing temperature significantly improved charge retention with greater charge retention correlating to greater annealing temperature.

Figure 6:
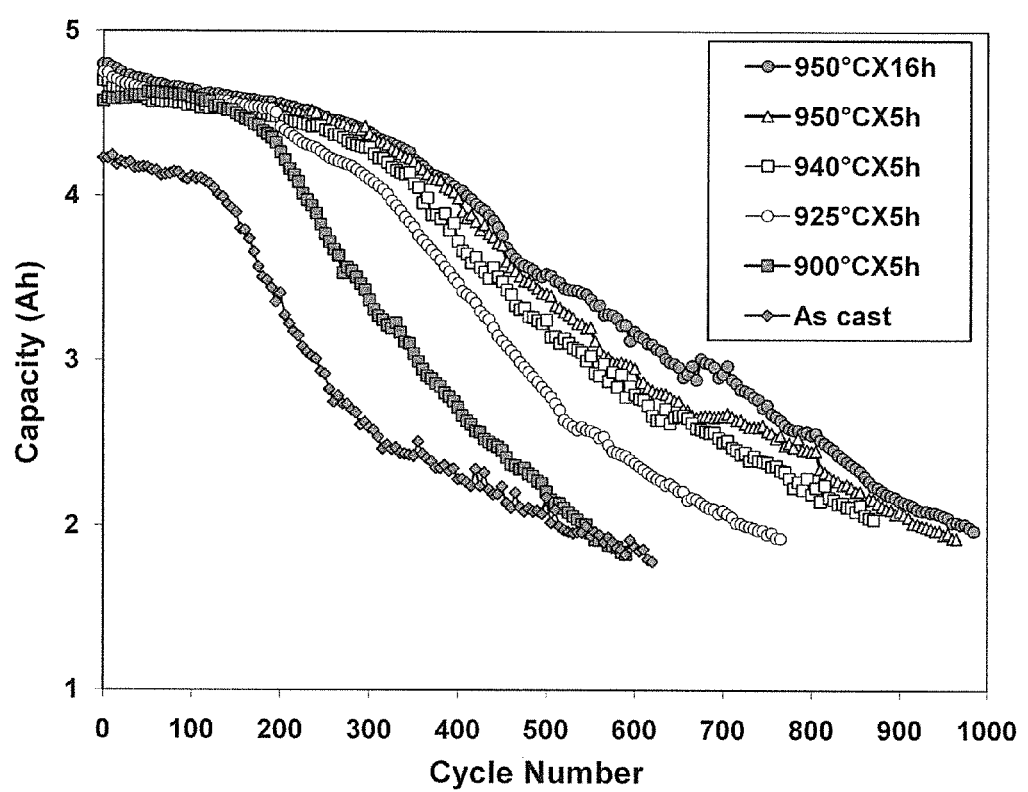
FIG. 6 illustrates cycle life of various materials according to the invention when used as an anode in C-sized cylindrical cells.

Cycle life of each battery was tested by repeating a charge/discharge cycling performed at room temperature until capacity of 2.0 Ah was reached. Charging was completed at a 0.5 C rate with a $-\Delta V$ termination method. The charging process was terminated when a 3 mV decrease from the maximum cell voltage was detected, indicating the completion of charge and the start of hydrogen-oxygen recombination. Discharge was completed at a 0.5 C rate with the cut-off voltage set at 0.9 V. The cell capacities measured during the cycle life are compared in FIG. 6 and the cycle number reaching 2.0 Ah capacity is listed in Table 5. Annealing at 900° C. did not affect the cycle life but did improve the

TABLE 5

Summary of electrochemical properties of as-case and annealed alloys.

| Alloy | Full capacity @ $2^{rd}$ cycle (mAh $g^{-1}$) | High-rate capacity @ $6^{rd}$ cycle (mAh $g^{-1}$) | Activation cycle reaching 98% of stabilized HRD | HRD | Diffusion coefficient D ($10^{-10}$ $cm^2$ $s^{-1}$) | Exchange current $I_o$ (mA $g^{-1}$) | 30-day charge retention | Cycle life |
|---|---|---|---|---|---|---|---|---|
| As-cast | 342 | 321 | 3 | 0.939 | 9.64 | 20.1 | 0.41 | 545 |
| 900° C. × 5 h | 350 | 336 | 3 | 0.960 | 6.09 | 29.9 | 0.68 | 545 |
| 925° C. × 5 h | 359 | 344 | 3 | 0.958 | 5.51 | 30.7 | 0.72 | 725 |
| 940° C. × 5 h | 356 | 342 | 3 | 0.960 | 6.06 | 32.0 | 0.78 | 875 |
| 950° C. × 5 h | 355 | 338 | 4 | 0.952 | 8.18 | 29.3 | 0.79 | 925 |
| 950° C. × 16 h | 361 | 342 | 6 | 0.947 | 6.61 | 24.6 | 0.80 | 980 |

Annealing increases both full and high-rate capacities. Little difference is observed by annealing at a temperature in excess of 925° C. The HRD, however, declined when the annealing temperature was increased to 950° C. Without being limited to one particular theory, one possible explanation of the HRD degradation is the reduction in the abundance of catalytic $NdNi_5$ phase which moves the amount of this secondary phase below a sufficiently synergistic contribution when associated with the main phase materials.

Conventionally, both the bulk diffusion coefficient (D) and surface exchange current ($I_o$) are used to study the source of HRD changes. The values of both parameters are also listed in Table 5. All D values indicate easier hydrogen transportation in the bulk of Nd-only $AB_{3.74}$ alloys. The as-cast sample with the largest amount of $NdNi_5$ secondary phase had the highest D value but the lowest $I_o$ value. Annealing improved the surface catalytic ability at the expense of more difficult hydrogen diffusion. $I_o$ decreased at the highest annealing temperature (950° C.) indicating a more homogeneous alloy with a positive electrode utilization. Increasing the annealing temperature extended the cycle life that appeared to plateau as the temperature reached 950° C. Increasing the annealing time to 16 hours modestly further improved cycle life.

Overall, compared to the as-cast sample, those annealed at 900° C. and 925° C. for 5 h showed: reduced unit-cell volumes, increased composition uniformity, more $Nd_2Ni_7$ main phase, less $NdNi_5$ secondary phase, increased capacities of both gaseous phase and electrochemistry, flatter PCT isotherm with decreased hysteresis, and improved activation, high-rate dischargeability, and charge retention. Further increasing the annealing temperature and/or duration resulted in insignificant further change in main phase abundance and electrochemical storage capacity, continuously decreased $NdNi_5$ phase abundance such that annealing at 950° C. for 16 hours was reduced below synergistic levels, a decrease in gaseous phase hydrogen storage capacity and plateau pressure, a decrease in high-rate dischargeability and surface reaction current, and continuous improvement in charge retention and cycle life. The best high-rate dischargeability and balance among capacity, charge retention, and cycle life was observed in samples annealed at 940° C. for 5 h that produced an alloy with an adequate amount of NdNi$_5$ secondary phase (~2 wt. %) to synergistically contribute to the overall electrochemical performance of the alloy.

Patents, publications, and applications mentioned in the specification are indicative of the levels of those skilled in the art to which the invention pertains. These patents, publications, and applications are incorporated herein by reference to the same extent as if each individual patent, publication, or application was specifically and individually incorporated herein by reference.

In view of the foregoing, it is to be understood that other modifications and variations of the present invention may be implemented. The foregoing drawings, discussion, and description are illustrative of some specific embodiments of the invention but are not meant to be limitations upon the practice thereof. It is the following claims, including all equivalents, which define the scope of the invention.

The invention claimed is:

1. A compositionally and structurally disordered alloy with an overall non-uniform distribution of phases comprising a $A_2B_4$+x($AB_5$) phase structure, wherein x defines the average ratio of $A_2B_4$ to $AB_5$ and is greater than 2 and less than 4 and x is not a whole number, and wherein there are 1, 2, 3 or 4 $AB_5$ layers between $A_2B_4$ slabs, and wherein the average crystallite size of the disordered alloy along the ab-plane is larger than along the c-axis, and wherein at least one electrochemically active secondary phase is dispersed in the alloy and characterized in that said secondary phase contributes to the electrochemical performance of said alloy.

2. The alloy of claim 1 having a high-rate dischargeability of 0.977 or greater at cycle six.

3. The alloy of claim 1 wherein said high-rate dischargeability is 0.988 or greater at cycle six.

4. The alloy of claim 1 having an average crystallite size on the a-b plane at least 40% larger than along the c-axis.

5. The alloy of any one of claim 1 wherein said electrochemically active secondary phase is an $AB_5$ phase present at 2% to 8% in said material.

6. The alloy of any one of claim 1 wherein said alloy comprises a hydride forming metal component.

7. The alloy of claim 6 wherein said hydride forming metal is La, Ce, Pr, Nd, Pm, Sm, Y, or mixtures thereof.

8. The alloy of claim 6 wherein said hydride forming metal component comprises neodymium.

9. The alloy of claim 6 wherein said hydride forming metal component further comprises Mg at less than 5 atomic percent.

10. A process of forming a hydrogen storage material comprising: providing an ingot, said ingot comprising a hydride forming metal and a non-hydride forming metal; annealing said ingot at a temperature greater than 900 degrees Celsius for an annealing time, said step of annealing producing an overall compositionally and structurally disordered alloy with a non-uniform distribution of phases comprising a $A_2B_4$+x($AB_5$) phase structure wherein x defines the average ratio of $A_2B_4$ to $AB_5$ and is greater than 2 and less than 4 and x is not a whole number, and wherein there are 1, 2, 3 or 4 $AB_5$ layers between $A_2B_4$ slabs, and wherein at least one electrochemically active secondary phase is dispersed in the alloy and characterized in that said secondary phase contributes to the electrochemical performance of said alloy.

11. The process of claim 10 wherein said annealing time is from 4.5 to 8 hours.

12. The process of claim 10 wherein said temperature is from 925 to 940 degrees Celsius.

13. The process of claim 12 wherein said annealing time is 5 hours.

14. The process of claim 10 wherein said annealing step produces an alloy material having a high-rate dischargeability of 0.977 or greater at cycle six.

15. The process of claim 10 wherein said annealing step produces an alloy material having a high-rate dischargeability of 0.988 or greater at cycle six.

16. The process of claim 10 wherein said annealing step produces an alloy material having an average crystallite size on the a-b plane at least 40% larger than along the c-axis.

* * * * *